(12) United States Patent
Staehle

(10) Patent No.: US 11,555,504 B2
(45) Date of Patent: Jan. 17, 2023

(54) PUMP DEVICE, IN PARTICULAR SUBMERSIBLE PUMP DEVICE

(71) Applicant: Frideco AG, Neunkirch (CH)

(72) Inventor: Carl Staehle, Neunkirch (CH)

(73) Assignee: Frideco AG, Neunkirch (CH)

( * ) Notice: Subject to any disclaimer, the term of this patent is extended or adjusted under 35 U.S.C. 154(b) by 0 days.

(21) Appl. No.: 16/771,747

(22) PCT Filed: Dec. 19, 2018

(86) PCT No.: PCT/EP2018/086013
§ 371 (c)(1),
(2) Date: Jun. 11, 2020

(87) PCT Pub. No.: WO2019/122035
PCT Pub. Date: Jun. 27, 2019

(65) Prior Publication Data
US 2021/0071676 A1     Mar. 11, 2021

(30) Foreign Application Priority Data

Dec. 22, 2017  (DE) ...................... 10 2017 131 227.7

(51) Int. Cl.
| | | |
|---|---|---|
| *F04D 29/046* | (2006.01) | |
| *F04D 29/40* | (2006.01) | |
| *F04D 29/58* | (2006.01) | |
| *F04D 13/08* | (2006.01) | |
| *H02K 5/20* | (2006.01) | |

(52) U.S. Cl.
CPC .......... *F04D 29/046* (2013.01); *F04D 13/08* (2013.01); *F04D 29/406* (2013.01); *F04D 29/586* (2013.01); *H02K 5/203* (2021.01)

(58) Field of Classification Search
CPC ........ F04D 13/06; F04D 13/08; F04D 29/406; F04D 29/586
See application file for complete search history.

(56) References Cited

U.S. PATENT DOCUMENTS

| | | | |
|---|---|---|---|
| 2014/0079578 A1* | 3/2014 | Irie | ........................ F04C 11/008 417/423.14 |
| 2014/0232217 A1 | 8/2014 | Miyama et al. | |
| 2015/0192130 A1* | 7/2015 | Yazykov | ................. F04D 13/08 417/423.3 |

(Continued)

FOREIGN PATENT DOCUMENTS

| | | |
|---|---|---|
| DE | 1 703 433 A1 | 12/1971 |
| DE | 10 112 500 A1 | 9/2002 |

(Continued)

OTHER PUBLICATIONS

Examination Report dated Jan. 27, 2021 issued in corresponding DE application No. 10 2017 131 227.7 (and English translation).

(Continued)

*Primary Examiner* — Topaz L. Elliott
*Assistant Examiner* — Jackson N Gillenwaters
(74) *Attorney, Agent, or Firm* — Posz Law Group, PLC

(57) ABSTRACT

A pump device, in particular submersible pump device, has at least one bearing receptacle which is configured for receiving a drive shaft end bearing, wherein the bearing receptacle has at least one cooling channel for receiving at least one cooling fluid.

17 Claims, 6 Drawing Sheets

(56) References Cited

U.S. PATENT DOCUMENTS

Figure 1:
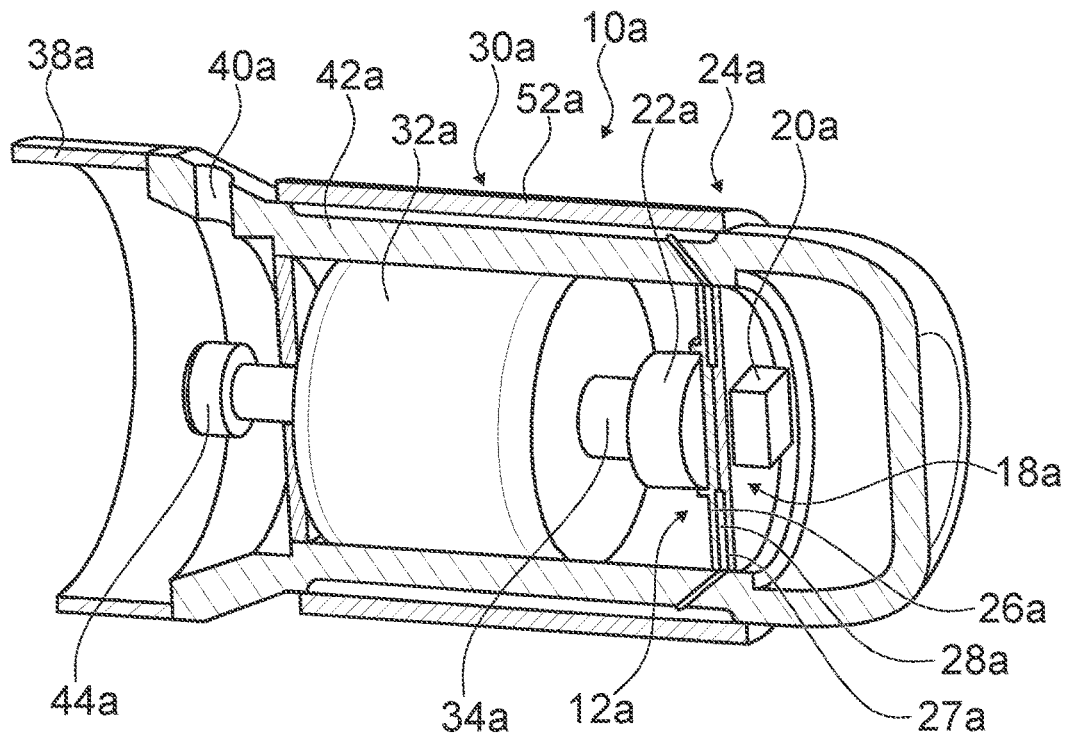

| | | | | |
|---|---|---|---|---|
| 2016/0201685 A1* | 7/2016 | Becker | ................... | F04D 13/08 |
| | | | | 384/517 |
| 2017/0025917 A1* | 1/2017 | D'Ambrosio | ........... | F04D 13/06 |
| 2017/0114790 A1* | 4/2017 | Pohler | ................... | F04D 29/426 |
| 2018/0291998 A1* | 10/2018 | Allbritten | ............. | F04D 29/046 |

FOREIGN PATENT DOCUMENTS

| | | | |
|---|---|---|---|
| DE | 20317814 U | * | 2/2004 |
| DE | 203 17 814 U1 | | 4/2004 |
| DE | 11 2012 003 901 T5 | | 8/2014 |
| JP | 11201077 A | * | 7/1999 |
| JP | H11-201077 A | | 7/1999 |
| JP | 2001-355591 A | | 12/2001 |
| JP | 2004-039749 A | | 2/2004 |
| JP | 2005-230066 A | | 9/2005 |
| WO | 2012/024778 A1 | | 3/2012 |
| WO | 2014/090314 A1 | | 6/2014 |

OTHER PUBLICATIONS

Examination Report dated Jan. 28, 2021 issued in corresponding CN Patent Application No. 201880083055.X (and English translation).

Search Report dated Oct. 26, 2018 issued in corresponding DE Patent Application No. 10 2017 131 227.7 (and English translation).

International Search Report dated Mar. 19, 2019 issued in corresponding International Patent Application No. PCT/EP2018/086013 (English translation only).

International Preliminary Report on Patentability dated Jun. 23, 2020 issued in corresponding International Patent Application No. PCT/EP2018/086013 (English translation only).

Chinese Office Action dated Sep. 27, 2021 issued in corresponding CN application No. 201880083055.X and English translation.

Office Action dated Mar. 1, 2022 issued in corresponding CN patent application No. 201880083055.X (and English translation).

Office Action dated Jul. 11, 2022 issued in corresponding EP Patent Application No. 18 833 640.8-1004 (and English translation).

* cited by examiner

PUMP DEVICE, IN PARTICULAR SUBMERSIBLE PUMP DEVICE

CROSS REFERENCE TO RELATED APPLICATIONS

This application is a U.S. national stage application of PCT/EP2018/086013 filed on Dec. 19, 2018, which is based on German Patent Application No. 10 2017 131 227.7 filed on Dec. 22, 2017, the contents of which are incorporated herein by reference.

PRIOR ART

The invention relates to a pump device, in particular a submersible pump device, as per the preamble of claim 1, and to a method for operating a pump device as per the preamble of claim 11.

Pump devices in which a motor is cooled by way of cooling channels running laterally at a shell of the pump device are already known. Pump devices which have housing units for electrical components are also known.

The object of the invention is in particular to provide a device of the generic type which has improved properties with regard to cooling. The object is achieved according to the invention by the features of patent claims 1 and 11, while advantageous implementations and further developments of the invention can be taken from the dependent claims.

Advantages of the Invention

The invention is based on a pump device, in particular a submersible pump device, having at least one bearing receptacle which is configured for receiving a drive shaft end bearing.

It is proposed that the bearing receptacle has at least one cooling channel for receiving at least one cooling fluid. In this way, improved cooling can be provided. In particular, the drive shaft end bearing can be cooled via the bearing receptacle.

A "pump device" is to be understood as meaning in particular at least one part, in particular a subassembly, of a pump. In particular, the pump device may also comprise the entire pump. A "pump", in particular a submersible pump, is to be understood as meaning in particular an apparatus which, in at least one operating state, provides a movement of a preferably incompressible medium to be pumped. Preferably, the pump device has a shell unit which outwardly delimits the pump, has a drive shaft which is operated by a motor unit of the pump device, and/or has a screw unit which, in at least one operating state, is set in rotation by the drive shaft, wherein the rotation of the screw unit provides the movement of the medium to be pumped. Alternatively, the pump device may have a piston unit which is operated by a motor unit of the pump device and which, by way of a displacement process, sets the medium to be pumped in motion. The motor unit may in particular have a combustion motor. The motor unit particularly advantageously has an electric motor. In at least one operating state, in particular, it is possible for the pump to be arranged outside and/or at least partially or else completely within the medium to be pumped.

A "cooling fluid" is to be understood as meaning in particular a liquid which is configured for absorbing heat of at least one element and transmitting said heat in particular to at least one other element. The cooling fluid preferably has a high thermal conductivity and/or heat capacity. The cooling fluid particularly preferably has a viscosity which allows the cooling fluid to be pumped. It is conceivable that the cooling fluid is identical to the pumped medium, although preferably the cooling fluid is different from the pumped fluid and specially configured for cooling the pump. Cooling fluids may comprise for example water and/or oils.

"Configured" is in particular to be understood as meaning specifically designed and/or equipped. The statement that an object is configured for a particular function is in particular to mean that the object fulfills and/or performs said particular function in at least one state of use and/or operating state.

A "drive shaft end bearing" is to be understood as meaning in particular a receptacle which, in a mounted state, receives at least one bearing unit of the pump device for mounting, in particular for rotatable mounting, of at least one part, in particular an end region, of a drive shaft of the pump device. A "bearing unit" is to be understood as meaning in particular a unit which is configured for at least substantially accommodating a weight force of at least one object. The bearing unit may in particular have at least one rolling bearing and/or slide bearing. The drive shaft preferably has an elongate form, the drive shaft in particular having a longitudinal extent which is at least 5 times, in particular at least 10 times, advantageously at least 20 times, particularly advantageously at least 30 times and preferably at least 50 times, as large as extents of the drive shaft that are oriented perpendicularly to the longitudinal extent. Particularly preferably, at a first end of the drive shaft, the drive shaft is connected, in particular in a form-fitting manner, to the screw unit. In particular, at a second end, opposite the first end, of the drive shaft, the drive shaft is connected in a form-fitting manner to the bearing unit. The motor unit is advantageously arranged in a sub-region of the drive shaft between the first and second ends. Here, a "main direction of extent" of an object is to be understood as meaning in particular a direction which runs parallel to a longest edge of a smallest imaginary cuboid which just completely encloses the object.

It is furthermore proposed that the bearing receptacle is of plate-like form. "Plate-like" is to be understood as meaning in particular an element for which a smallest imaginary cuboid which just completely encloses the element has a height which corresponds to at most 50%, in particular at most 20%, advantageously at most 10%, preferably at most 5%, of a longest edge and/or of a shortest edge of the cuboid. It is conceivable that the bearing receptacle has at least a cylindrical, in particular circular-cylindrical, outer contour. Preferably, the outer contour of the bearing receptacle is in the form of a cuboid. For example, the bearing receptacle may be in the form of a wall part. The bearing receptacle is advantageously in the form of a bearing cover. A "bearing cover" is to be understood as meaning in particular an element which, together with a wall of the pump device, forms an outer closure of a volume. The bearing cover may be connected to the wall in a force-fitting, form-fitting and/or materially bonded manner. In this way, a simplified construction and an optimization of installation space can be provided. In particular, the bearing receptacle can be easily stacked in the case of transportation and/or storage. It is advantageously possible for at least one sub-region of the bearing receptacle, in a mounted state, to be in the form of a placement surface and/or receiving surface.

It is furthermore proposed that the bearing receptacle has at least one passage opening which is configured as a pass-through for at least one structural unit. In particular, the structural unit may be part of the pump device and have in particular at least one line, in particular at least one cable and/or at least one fluid line which is formed differently than the cooling channel, or be in the form of a line, in particular a cable and/or a fluid line which is formed differently than the cooling channel. The passage opening has in particular a diameter of at most one quarter, preferably of at most one sixth, and particularly preferably of at most one eighth, of a diameter of the bearing receptacle. A "diameter" of an object is to be understood as meaning in particular a diameter of a smallest imaginary cylinder which just encloses the object. In particular, the bearing receptacle may have in particular multiple, mutually different passage openings, which may in particular be configured for receiving different structural units, in particular different types of lines. The lines are advantageously in the form of electrical lines. In this way, increased flexibility can be achieved. In particular, an arrangement of components of the pump device can be implemented in a more flexible manner. For example, at least one first component can be arranged on a top side and/or on a bottom side of the bearing receptacle. The first component may advantageously have a structural unit which is passed through the passage opening and which connects the first component to at least one further component on an opposite side of the bearing receptacle.

In a further implementation, it is proposed that the bearing receptacle is produced at least partially in a casting process. The bearing receptacle may furthermore be produced completely in a casting process. Preferably, parts of the bearing receptacle are produced in a casting process and connected to one another during the mounting. A bearing receptacle produced by a casting process can be distinguished, in particular by a person skilled in the art by means of methods known to him or her, from a bearing receptacle for the production of which other processes, in particular forging and/or machining processes, were used. For example, a product produced by a casting process comprises in particular at least one cast metal which is in particular configured to be used in a casting process. In this way, a simple production can be provided. In particular, the bearing receptacle can be produced with few working processes. Furthermore, a bearing receptacle produced in a casting process comprises at least one cast metal. Alternatively, the bearing receptacle can be produced in a punching process. In this way, an efficiency can be increased. In particular, the production of the bearing receptacle can be sped up.

It is furthermore proposed that the at least one cooling channel of the bearing receptacle is formed by a drilled cooling channel. It is in particular also conceivable that the cooling channel is formed by a milled cooling channel. In particular, the cooling channel is implemented to be continuous through the entire bearing receptacle. In a further implementation, it is possible for multiple cooling channels to open into a common opening, which is arranged for example around a central point of the bearing receptacle. For the production of the drilled cooling channel, a bore hole is made by machining by means of a drilling apparatus in particular at a blank, which blank is configured to be processed in a manufacturing process to form a bearing receptacle. The bore hole forms here in particular the drilled cooling channel. A cooling channel formed by a bore hole can be distinguished, in particular by a person skilled in the art by means of methods known to him or her, from a cooling channel for the production of which other processes, in particular forging and/or casting processes, were used. In particular, the cooling channel has an at least substantially cylindrical shape. Furthermore, a drilling process can be established by grooves and/or channels and/or plastic deformations at the surface of the bore hole. In this way, a simple design can be achieved. In particular, it is advantageously possible to provide multiple discharges and/or feeds for the cooling fluid in a cooling circuit. In particular, through selection of a drilling head, a diameter of the cooling channel can be exactly defined. Moreover, the same blank may be used for different embodiments of the bearing receptacle, whereby increased flexibility can be made possible.

In a further implementation of the invention, it is proposed that the bearing receptacle has at least two plate-like elements which, in a mounted state, form the at least one cooling channel. In particular, in a mounted state, the plate-like elements may be fixed to one another by way of welding and/or adhesion and/or at least one detent connection. In a mounted state, the plate-like elements are particularly advantageously fixed to one another by means of a screw connection. In particular, the plate-like elements may each have at least one cutout which forms at least one common cooling channel. Preferably, only one plate-like elements has the cutout. In this way, a simplified production, mounting and/or demounting is made possible. In particular, during the mounting and demounting, the bearing receptacle can be mounted and demounted in parts, whereby weight and volume of the components to be handled during the mounting and demounting are reduced. The cutouts are preferably formed as grooves which are open toward the exterior of the bearing receptacle at the start and end. The wording that a cutout, recess, groove, notch or a hole of an object is "open toward the exterior of the object" is advantageously to be understood as meaning that the cutout, recess, groove, notch or the hole defines an empty space which, at one end of the cutout, recess, groove, notch or the hole, forms a direct or indirect contact with respect to the medium surrounding the object. An "indirect contact" is preferably to be understood as meaning that the empty space is adjacent to another empty space, which forms a direct contact with respect to the medium surrounding the object. Preferably, a first opening serves for the feeding of the cooling fluid, and a second opening serves for the discharge of the cooling fluid. For example, the grooves may pass through the bearing receptacle in the manner of a straight line. In another implementation, the grooves may be curved. In a further implementation, the grooves may open into a common opening. In this way, improved cooling can be provided. In particular, an improved flow of the cooling fluid can be provided. Moreover, a simple design can be achieved. It is possible in particular to provide multiple discharges and/or feeds for the cooling fluid in a cooling circuit.

In a further implementation, it is proposed that the pump device has at least one receiving region for at least one functional unit, which receiving region, at least partially, is delimited by the bearing receptacle and is cooled via the bearing receptacle in at least one operating state. A "receiving region" is to be understood as meaning in particular a spatial region which is situated on a side of the bearing receptacle that faces away from the drive shaft end bearing and which is configured for receiving and mounting at least one functional unit. For example, the receiving region, for the purpose of mounting the functional unit, may have a weld seam, an adhesive layer, a threaded opening, a detent tongue or a plug connector. The functional unit may in particular be part of the pump device. A "functional unit" is to be understood as meaning in particular a unit which is configured to provide at least one function in at least one operating state. For example, the functional unit may have a measurement unit and/or a drive unit and/or a transmission unit. The functional unit preferably has electrical components which are cooled via the bearing receptacle. The functional unit particularly preferably has at least one electronic control unit. It is also conceivable that the functional unit has a further drive shaft end bearing of a further drive shaft. In this way, improved cooling and an optimization of installation space can be provided. In particular, the bearing receptacle may provide, in addition to the cooling of the drive shaft end bearing, cooling of the functional unit.

It is furthermore proposed that the pump device has a shell unit, which may in particular be in the form of a cooling unit, which comprises at least one cooling channel. The cooling channel may in particular be realized as a groove. The openings, in a mounted state, advantageously form a common connection with the cooling channel of the bearing receptacle. Furthermore, the openings can make possible a feed or discharge of the cooling fluid. Preferably, a groove of the bearing receptacle forms a cooling circuit with a corresponding groove of the shell unit. Alternatively, a cooling circuit may consist of multiple corresponding groove pairs. In this way, improved cooling and a simplified construction are provided. In particular, the entire drive shaft can be cooled by way of a cooling circuit.

It is furthermore proposed that the pump device has an explosion protection unit which provides at least one explosion protection feature. In particular, the explosion protection unit may be implemented at least partially integrally with the bearing receptacle and/or the drive shaft end bearing and/or the receiving region and/or the shell unit. "At least partially integrally" is to be understood in this context as meaning in particular that at least one element of a first unit is also at the same time part of a second unit. An "explosion protection feature" is to be understood as meaning in particular a feature of conformity, in particular with regard to a design, which complies with the explosion protection guidelines for a device of the generic type and which prevents damage to the immediate vicinity of the pump device in the event of an explosion within the pump device. This may be provided for example by a reinforced shell unit and/or by a pressure compensation unit of the pump device. A "pressure compensation unit" is to be understood as meaning in particular a unit which is arranged at a boundary between two regions and which, in case of an increase in pressure within the first region, provides pressure compensation with respect to the second region. A pressure compensation unit may in particular be embodied as a valve. In this way, an increased level of safety of the pump device can be provided.

DRAWINGS

Further advantages will emerge from the following description of the drawings. Exemplary embodiments of the invention are illustrated in the drawings. The drawings, the description and the claims contain numerous features in combination. A person skilled in the art will also expediently consider the features individually and combine them into appropriate further combinations.

Figure 2:
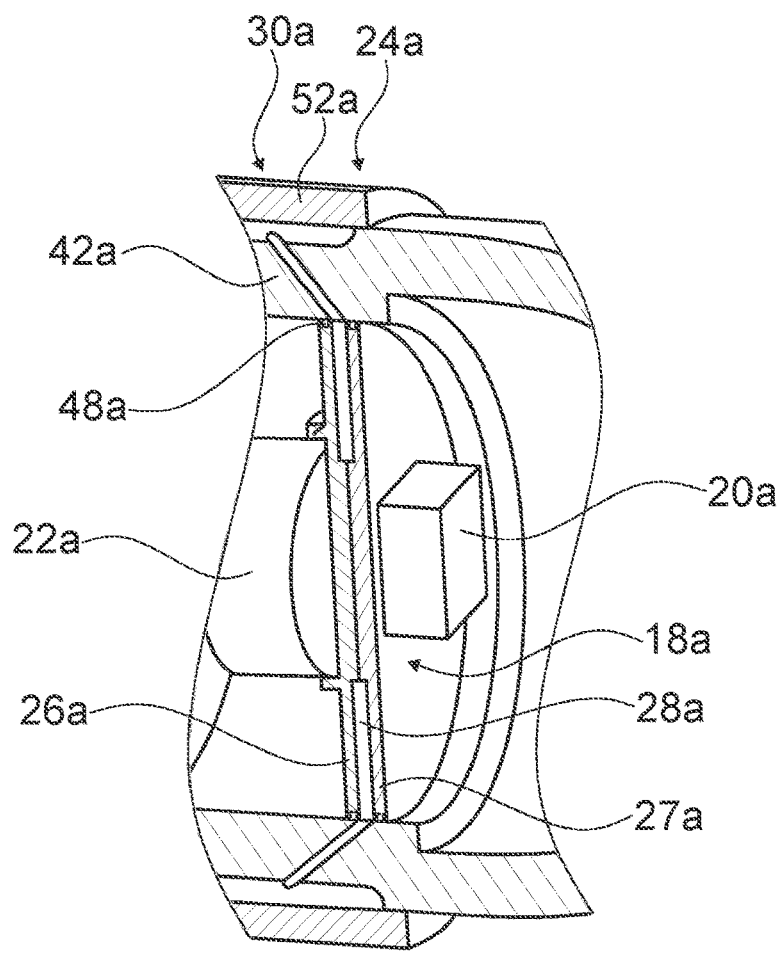
Figure 3:
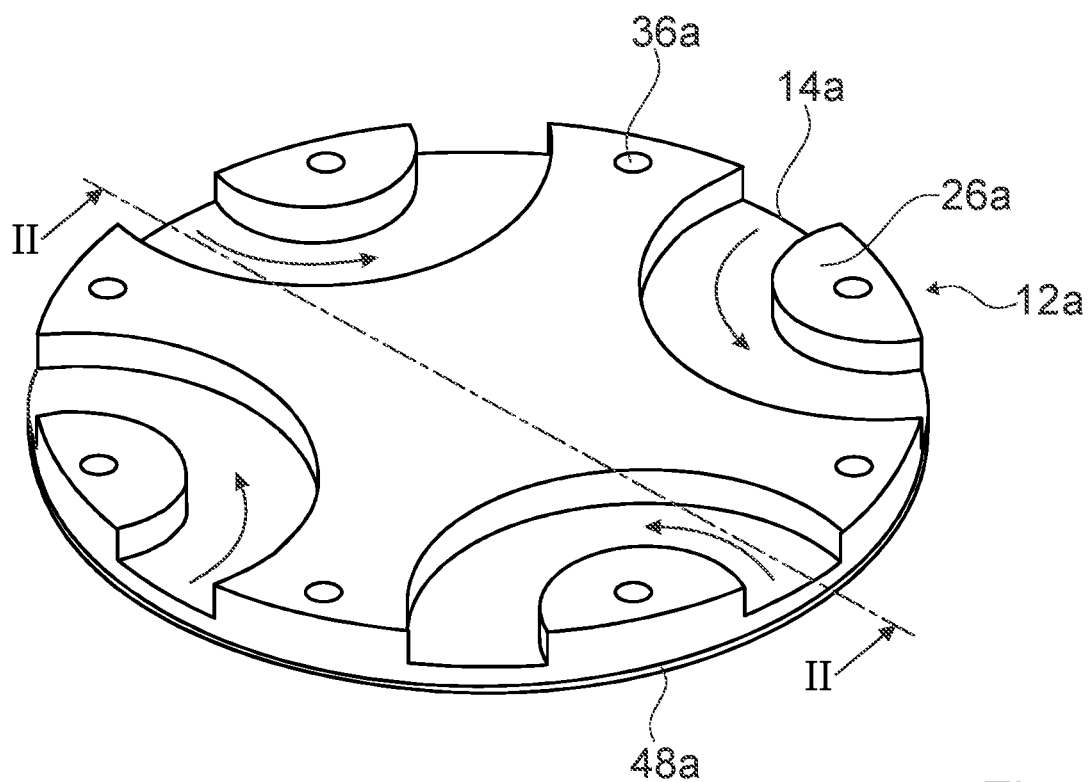
Figure 4:
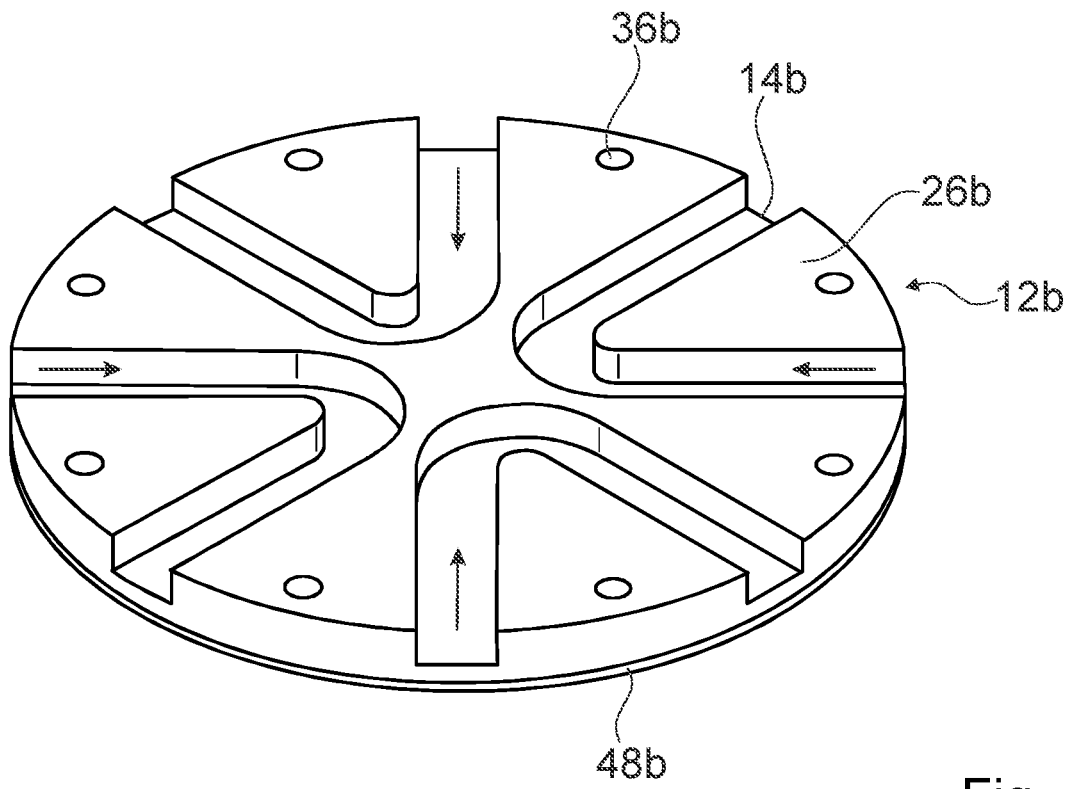
Figure 5:
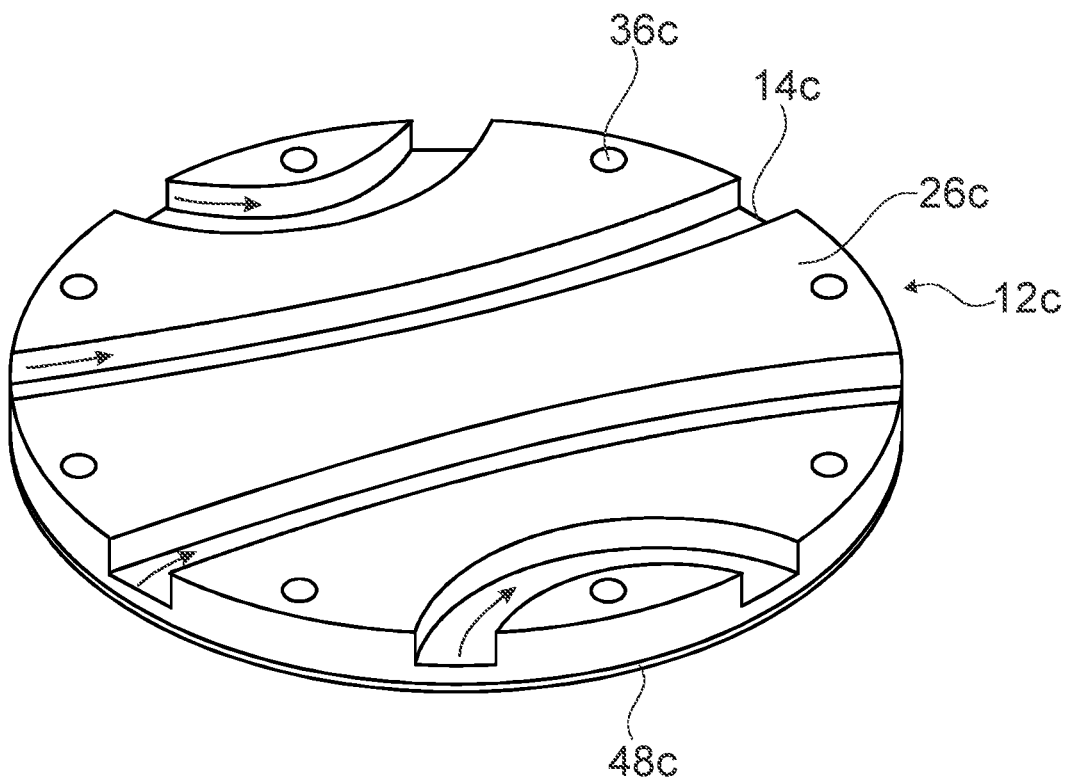
Figure 6:
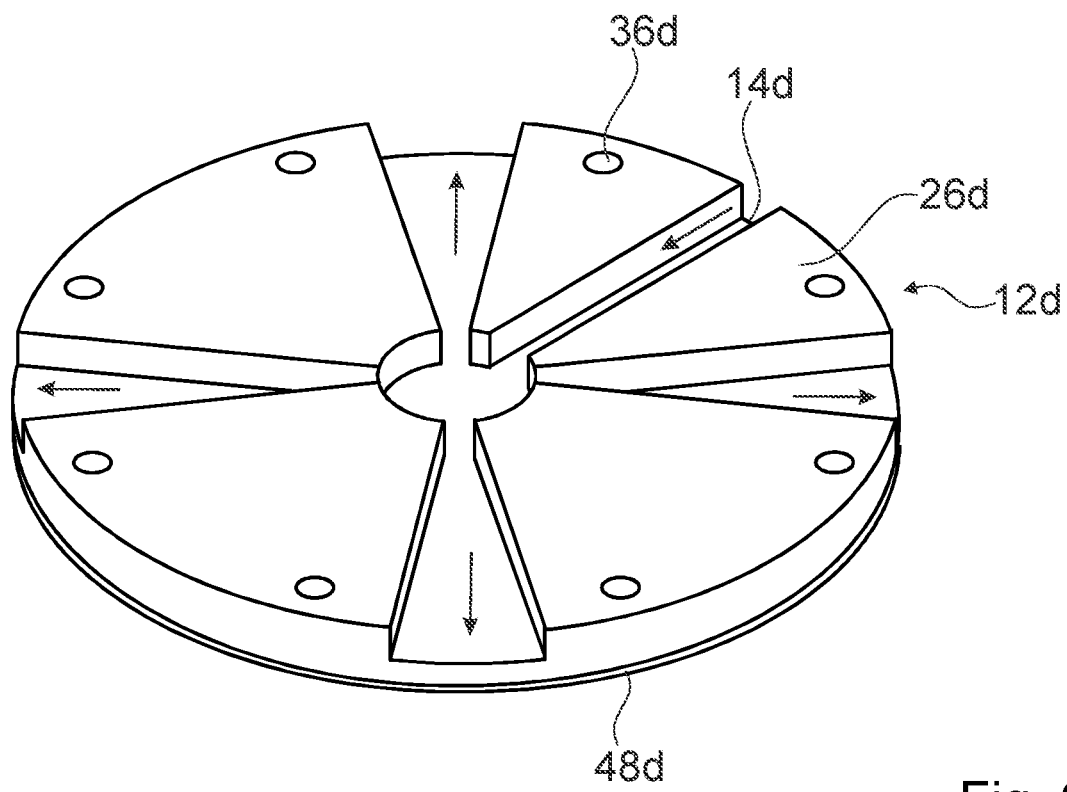
Figure 7:
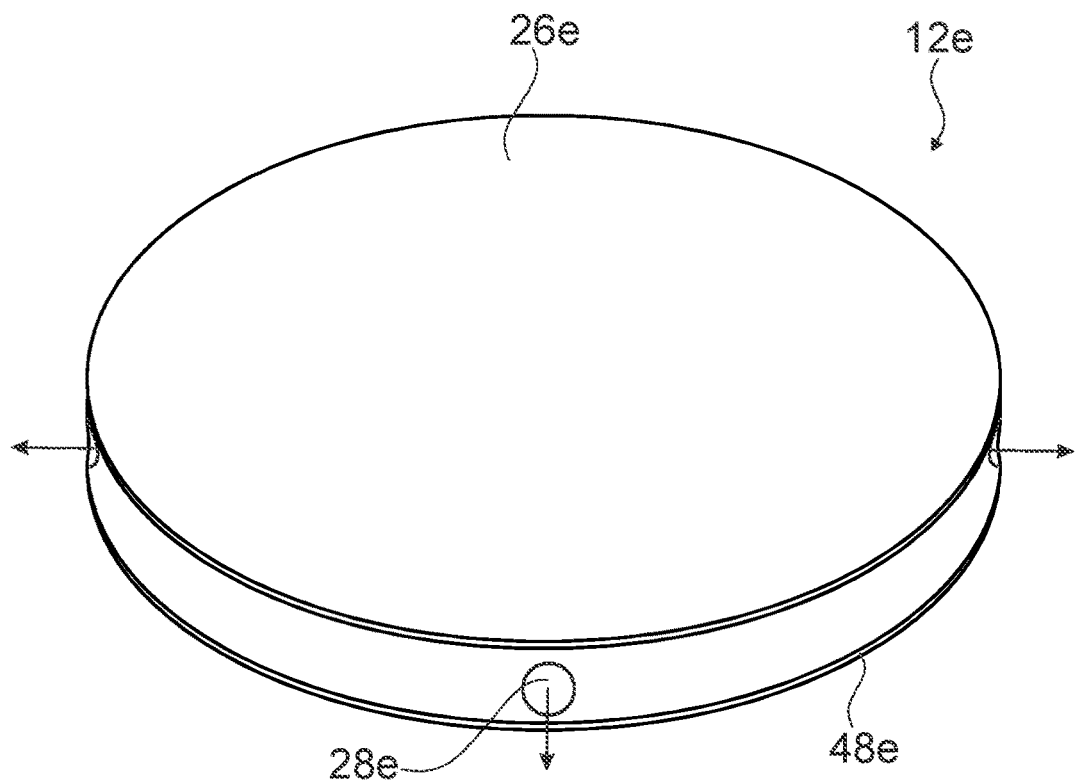
Figure 8:
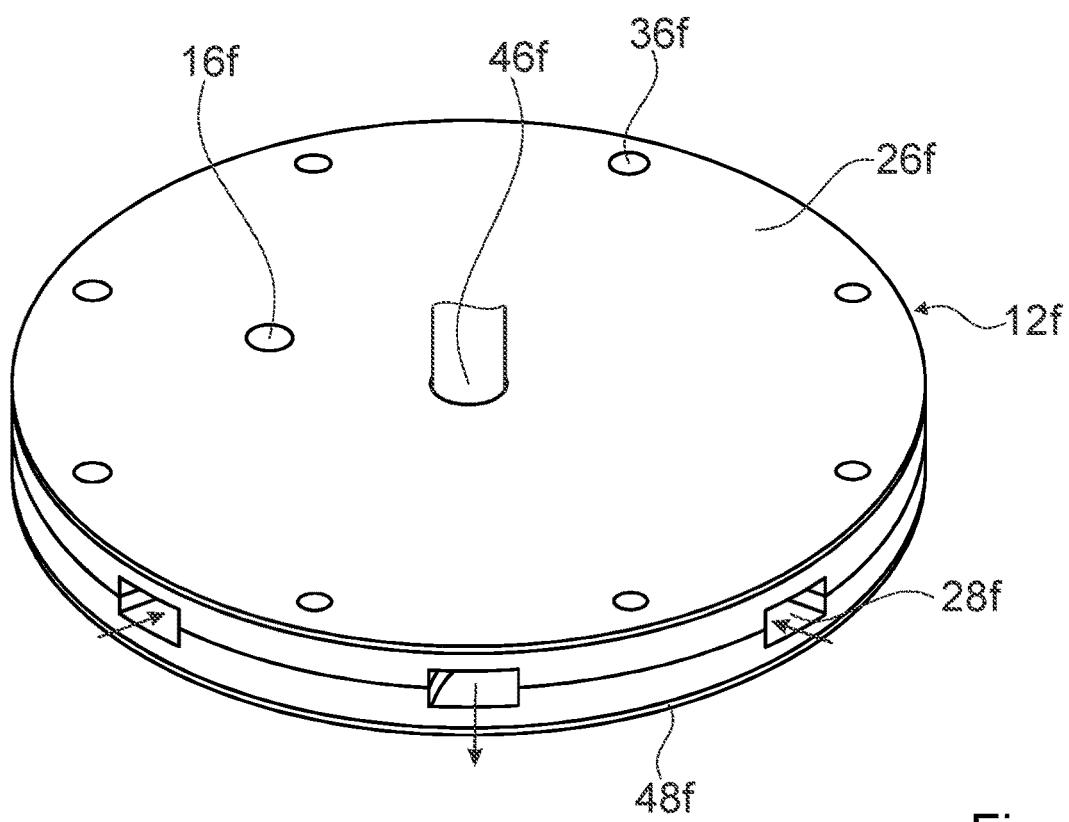
Figure 9:
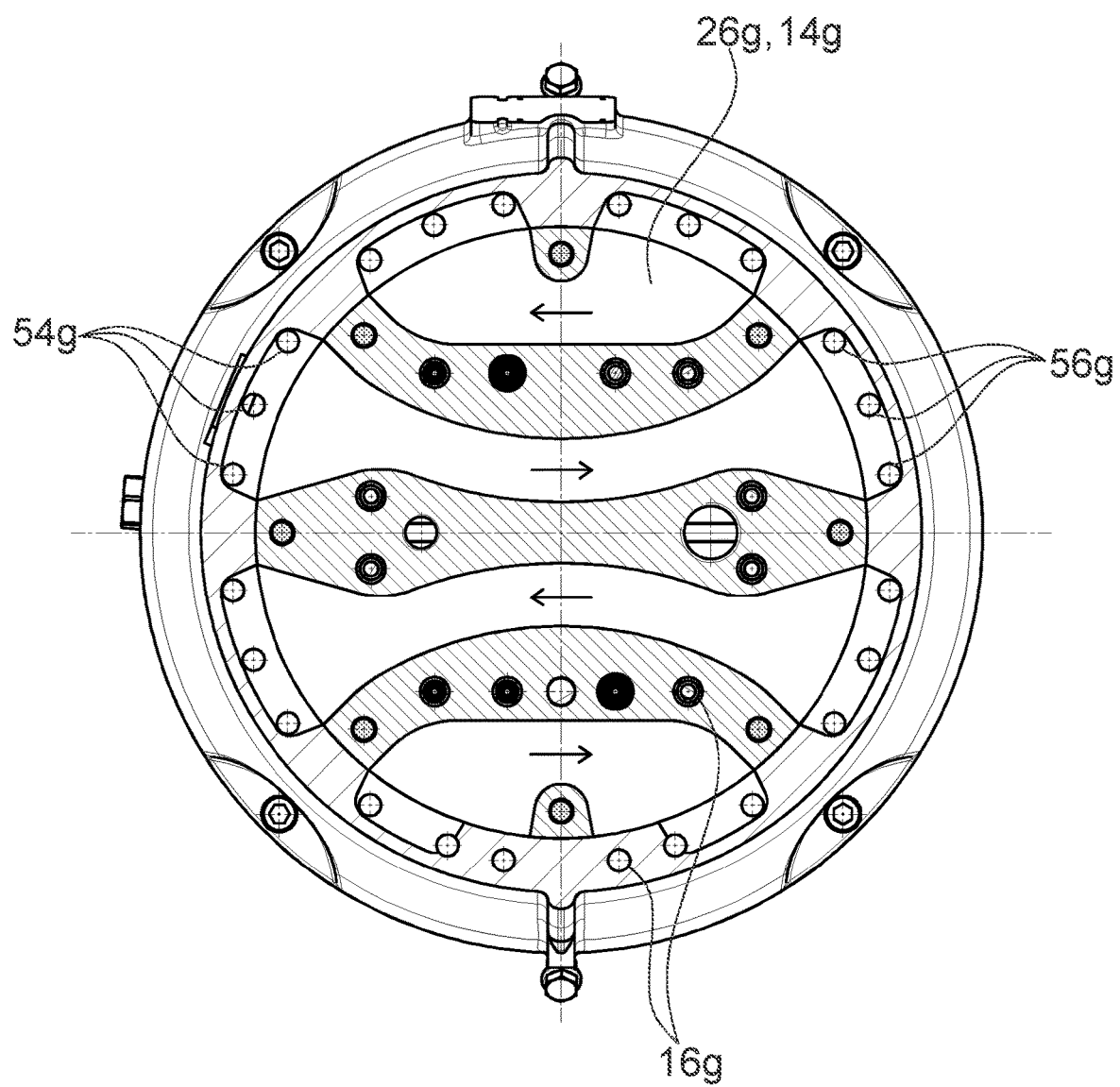
Figure 10:
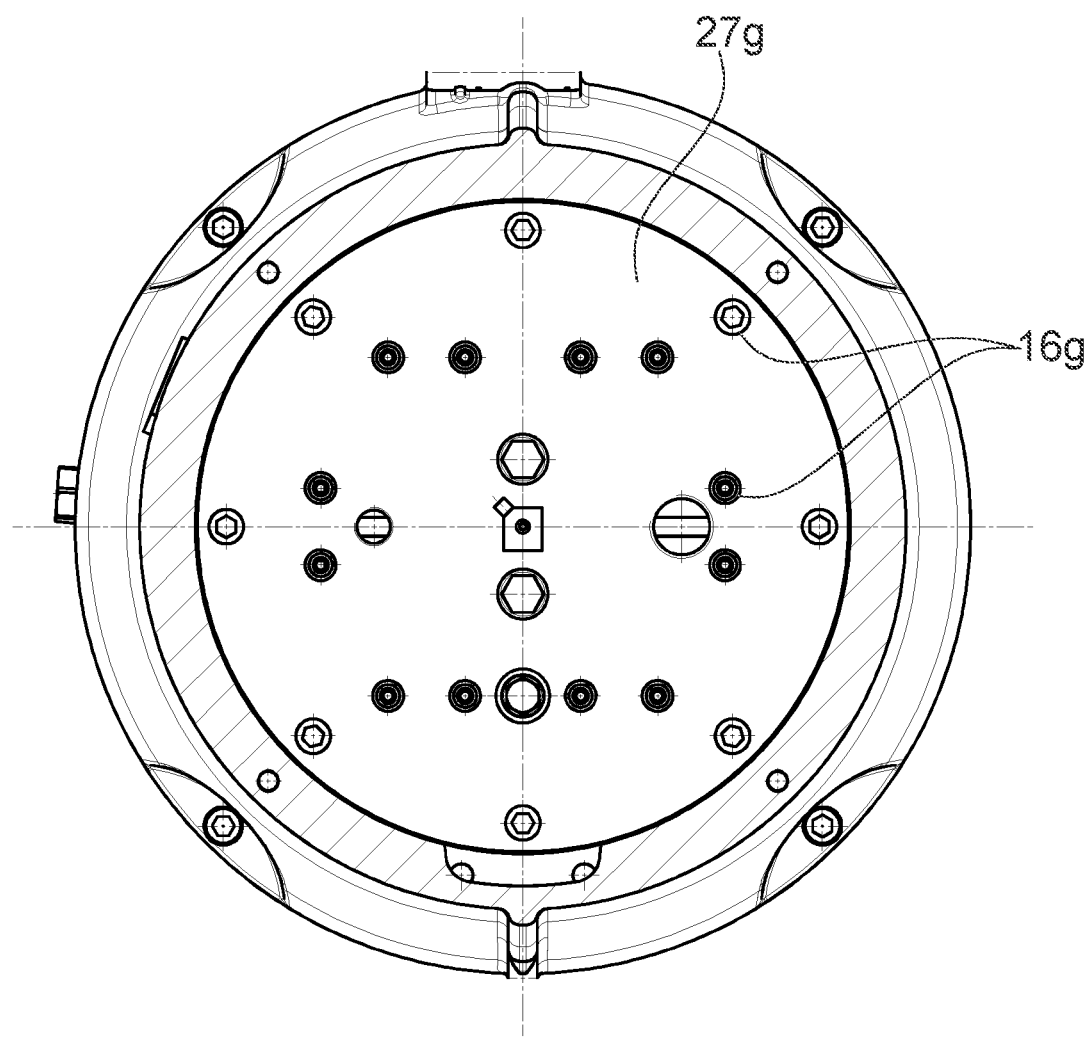

In the drawings:

FIG. 1 shows a pump with a pump device in a highly simplified schematic partial sectional illustration, FIG. 2 shows a part of the pump device with a bearing receptacle in a schematic partial sectional illustration, FIG. 3 shows a part of the bearing receptacle in a schematic illustration, FIG. 4 shows a part of a further bearing receptacle in a schematic illustration, FIG. 5 shows a part of a further bearing receptacle in a schematic illustration, FIG. 6 shows a part of a further bearing receptacle in a schematic illustration, FIG. 7 shows a further bearing receptacle in a schematic illustration, FIG. 8 shows a further bearing receptacle in a schematic illustration, FIG. 9 shows a part of a further bearing receptacle in a schematic illustration, and FIG. 10 shows a part of the further bearing receptacle from FIG. 9 in a schematic illustration.

DESCRIPTION OF THE EXEMPLARY EMBODIMENTS

FIG. 1 shows a pump 10a in a highly simplified schematic partial sectional illustration. The pump 10a is in the form of a submersible pump 10a, which is operable both in a state partially submerged by a medium to be pumped and in a state above the medium to be pumped. The pump 10a has for this purpose a special cooling system, which ensures sufficient cooling of the components of said pump even in the non-submerged state. The pump 10a is for example in the form of a centrifugal pump.

The pump 10a has a pump device. The pump device has a shell unit 30a. The shell unit 30a outwardly delimits the pump 10a. The shell unit 30a may be manufactured at least partially from high-grade steel. The shell unit 30a has an outer wall of the pump 10a. The shell unit 30a has an outer shell 52a. The shell unit 30a has shell cooling channels 42a which are configured for receiving and/or conducting a cooling fluid. The shell cooling channels 42a of the shell unit 30a provide cooling of an interior space of the pump 10a. The shell cooling channels 42a are formed by way of an arrangement of the outer shell 52a over the outer wall. For example, the outer shell 52a could be fixed to the outer wall by way of a press fit.

The pump device has a motor unit 32a. The motor unit 32a has an electric motor. Alternatively, however, the motor unit 32a could also have a combustion motor. The motor unit 32a provides a rotational movement of a drive shaft 34a of the pump device. The drive shaft 34a is operatively connected to the motor unit 32a. The drive shaft 34a is configured for transmitting the rotational movement to a working unit 44a (illustrated merely in a schematically simplified manner) of the pump device.

The working unit 44a is operatively connected to the drive shaft 34a. The working unit 44a has a screw unit. The screw unit is configured for moving in a direction, by way of the rotational movement, the medium to be pumped. The direction is defined by the form of the screw unit. For example, the screw unit may have a spiral form. The medium to be pumped is, in at least one operating state, conducted to the screw unit through a feed 38a. The feed 38a may for example be in the form of a pipe opening. The screw unit moves the medium to be pumped in the direction of a discharge 40a. The discharge 40a is configured for conducting out of the pump 10a the medium to be pumped. The discharge 40a may for example be in the form of a further pipe opening.

The working unit 44a has a cooling unit. The cooling unit has a cooling screw unit. The cooling screw unit is configured for moving in a direction at least one cooling fluid to be pumped. The cooling screw unit moves the cooling fluid in the direction of the shell cooling channels 42a. The cooling fluid comprises for example an oil, and in other embodiments the cooling fluid may comprise water and/or alcohol.

The pump device has a bearing receptacle 12a. The bearing receptacle 12a has cooling channels 28a for receiving the cooling fluid. The bearing receptacle 12a is configured for receiving a drive shaft end bearing 22a of the pump device. The drive shaft end bearing 22a is configured for rotatable mounting of the drive shaft 34a at an end of the drive shaft 34a which faces away from the working unit 44a. In particular, the cooling channels 28a of the bearing receptacle 12a provide cooling of the drive shaft end bearing 22a and/or of the motor unit 32a. The shell cooling channels 42a of the shell unit 30a are, in a mounted state, fluidically connected to the cooling channels 28a of the bearing receptacle 12a. In particular, the shell cooling channels 42a of the shell unit 30a may, together with the cooling channels 28a of the bearing receptacle 12a, be at least part of a common cooling circuit. The bearing receptacle 12a is of plate-like form, in particular is in the form of a bearing cover.

An enlarged illustration of the shell cooling channels 42a and of the cooling channels 28a is illustrated in FIG. 2. FIG. 2 shows a part of the pump device in a sectional illustration along a line II-II in FIG. 3. FIG. 3 shows a part of the bearing receptacle 12a in an isometric illustration. The shell cooling channels 42a are in each case open toward the exterior of the shell unit 30a at the start and end. The cooling channels 28a of the bearing receptacle 12a are in the form of grooves. The cooling channels 28a are in each case open toward the exterior of the bearing receptacle 12a at the start and end.

In a mounted state, the openings of the cooling channels 28a and of the shell cooling channels 42a form common connections. Said common connections may in particular at least partially form a common cooling circuit. For example, it is possible for a common opening to feed the cooling fluid from the shell unit 30a to the bearing receptacle 12a, while another common opening discharges the cooling fluid from the bearing receptacle 12a to the shell unit 30a. In alternative implementations, an arbitrary number of the corresponding cooling channels 28a and shell cooling channels 42a may at least partially form an in particular at least partially branched cooling circuit, it being possible in particular for the pump device to have an arbitrary number of feeds and/or discharges for the cooling fluid. The bearing receptacle 12a has screw receptacles 36a. The screw receptacles 36a are configured for receiving screws. The screws serve for fixing the bearing receptacle 12a. The screw receptacles 36a may each be provided with a thread.

FIG. 3 shows a plate-like element 26a of the bearing receptacle 12a. The bearing receptacle 12a has two plate-like elements 26a, 27a. The plate-like elements 26a, 27a are screwed to one another, in particular using the screw receptacles 36a. It is alternatively possible for the plate-like elements 26a, 27a to be fixed to one another by way of a detent closure or by way of a rotary closure.

The plate-like elements 26a, 27a are of mutually identical form, and for this reason only the plate-like element 26a is described below. The plate-like elements 26a each have furrows 48a which are configured for receiving a seal ring. The plate-like elements 26a each have cutouts 14a. The cutouts 14a are formed as four half-ring-shaped grooves. The grooves are arranged at a 90° angle to one another. In alternative implementations, an arbitrary number of grooves, which correspond to an arbitrary portion of a ring, may be arranged in an arbitrary arrangement. The cutouts 14a, in a mounted state of the two plate-like elements 26a, form common cooling channels 28a. The cooling channels 28a are configured for receiving the cooling fluid. A flow direction of the cooling fluid within the cooling channels 28a is represented by arrows. Alternatively, a reversal of the flow direction of the cooling fluid in single or multiple cooling channels is also possible. Feeding and discharge of the cooling fluid is realized in a radial direction relative to an axis of rotation of the drive shaft 34a. In an alternative implementation, it would also be possible for only a first plate-like element 26a to have the cutouts 14a. The second plate-like element 26a could have for example a smooth surface. The bearing receptacle 12a, in particular the plate-like elements 26a, 27a are produced in a casting process.

The pump device has a receiving region 18a. The receiving region 18a is provided for receiving a functional unit 20a of the pump device. The cooling channels 28a of the bearing receptacle 12a provide cooling of the receiving region 18a and/or of the functional unit 20a. The functional unit 20a is for example in the form of an electronic control unit of the pump device.

The pump device furthermore has an explosion protection unit 24a. The explosion protection unit 24a is arranged on the bearing receptacle 12a. The explosion protection unit 24a is configured to provide in the region of the bearing receptacle 12a an explosion protection feature which complies with the explosion protection guidelines for a device of the generic type. For example, the explosion protection unit 24a may have sealing units which increase a compressive strength of the bearing receptacle 12a. Here, the sealing units may be arranged in the furrows 48a.

FIGS. 4 to 10 show six further exemplary embodiments of the invention. The following descriptions and the drawings are restricted substantially to the differences between the exemplary embodiments, wherein, with regard to identically designated components, in particular with regard to components with identical reference signs, reference may in principle also be made to the drawings and/or to the description of the other exemplary embodiments, in particular in FIGS. 1 to 3. For the purpose of distinguishing between the exemplary embodiments, the letter a has been added as a suffix to the reference signs of the exemplary embodiment in FIGS. 1 to 3. In the exemplary embodiments in FIGS. 4 to 10, the letter a has been replaced by the letters b to g. Individual arrows or all the arrows shown in FIGS. 4 to 10 for representing a flow direction may also be reversed in alternative implementations.

FIGS. 4 to 6 show plate-like elements 26b-d of in each case one bearing receptacle 12b-d, which plate-like elements have different embodiments of cutouts 14b-d.

FIG. 4 shows the plate-like element 26b of the bearing receptacle 12b with the cutouts 14b, which are formed as four respective grooves. The grooves each have two straight portions and one curved portion, the latter connecting the two straight portions. The grooves are arranged at a 90° angle to one another. In an alternative implementation, an arbitrary number of grooves may be provided with an arbitrary curvature of the curved portion and/or with an arbitrary length of the straight portions in an arbitrary arrangement. In this way, better cooling of a sub-region of the bearing receptacle 12b can be achieved. The sub-region is implemented as a region close to the center of the bearing receptacle 12b.

FIG. 5 shows the plate-like element 26c of the bearing receptacle 12c with the cutouts 14c, which are formed as four differently curved grooves. The cutouts 14c pass through the entire bearing receptacle 12c in a manner spaced apart from one another. Alternative implementations may have arbitrarily many grooves which are arbitrarily spaced apart from one another and which have arbitrary curvature.

FIG. 6 shows the plate-like element 26d of the bearing receptacle 12d, which has cutouts 14d in the form of four trapezoidal grooves. The grooves end in a central circular groove. A further, straight groove departs from the circular groove. In this embodiment, the straight groove serves for the feeding of the cooling fluid. The trapezoidal grooves serve for the discharge of the cooling fluid. In an alternative implementation, the straight groove may serve for the discharge of the cooling fluid and the trapezoidal grooves may serve for the feeding of the cooling fluid. In alternative implementations, it is possible to provide an arbitrary number of trapezoidal and/or straight grooves in an arbitrary arrangement.

FIG. 7 shows a bearing receptacle 12e which consists of a single plate-like element 26e and has drilled cooling channels 28e. Firstly, the plate-like element 26e was produced in a casting process. Subsequently, the cooling channels 28e were produced by drillings into the plate-like element 26e. The drilled cooling channels 28e are provided in this embodiment as five bores which meet at a central point of the bearing receptacle 12e, wherein, analogously to FIG. 4, one of the bores serves for the feeding of the cooling fluid, while the remaining bores serve for the discharge of the cooling fluid. Alternatively, the bearing receptacle 12e may have a series of continuous bores. In further implementations, the number and arrangement of the bores may be arbitrarily varied.

FIG. 8 shows a bearing receptacle 12f which has cutouts 14f realized in a manner analogous to the cutouts 14b in FIG. 4. The bearing receptacle 12f has two passage openings 16f. The passage openings 16f have different opening sizes with respect to one another. In a mounted state, the passage openings 16f can receive objects. One of the passage openings 16f receives a structural unit 46f. The structural unit 46f is in the form of an electrical line. The passage openings 16f are open on a side facing the drive shaft end bearing 22a and on a side opposite this side. In alternative implementations, the passage openings 16f may have identical sizes and/or there may be an arbitrary number thereof. The explosion protection unit (not illustrated) of the pump device has further sealing units. The further sealing units are arranged within the passage openings 16f. Objects received by the passage openings 16f are fixed by the sealing units within the passage openings 16f.

FIG. 9 and FIG. 10 show a bearing receptacle 12g. The bearing receptacle 12g has a plate-like element 26g. The plate-like element 26g has cutouts 14g realized in a manner analogous to the cutouts 14c in FIG. 5. The plate-like element 26g has passage openings 16g. The plate-like element 26g has axial feeds 54g. The axial feeds 54g provide feeding of the cooling fluid in an axial direction relative to an axis of rotation of a drive shaft (not illustrated). The plate-like element 26g has axial discharges 56g. The axial feeds 54g provide feeding of the cooling fluid in an axial direction relative to the axis of rotation of the drive shaft. The bearing receptacle 12g has a plate-like element 27g which is formed differently than the plate-like element 26g. The plate-like element 27g has a smooth surface. The plate-like element 27g is in the form of a bearing cover. The plate-like element likewise has passage openings 16g. The plate-like elements 26g, 27g form common cooling channels (not illustrated), which are of U-shaped form.

REFERENCE SIGNS

10 Pump
12 Bearing receptacle
14 Cutout
16 Passage opening
18 Receiving region
20 Functional unit
22 Drive shaft end bearing
24 Explosion protection unit
26 Plate-like element
27 Plate-like element
28 Cooling channel
30 Shell unit
32 Motor unit
34 Drive shaft
36 Screw receptacle
38 Feed
40 Discharge
42 Shell cooling channel
44 Work unit
46 Structural unit
48 Furrows
52 Outer shell
54 Axial feed
56 Axial discharge

The invention claimed is:

1. A pump device having at least one bearing receptacle which is configured for receiving a drive shaft end bearing, wherein the bearing receptacle is of plate-like form and has at least one cooling channel for receiving at least one cooling fluid, wherein the pump device has a shell unit which comprises cooling channels which are formed as grooves in the shell unit which are disposed parallel to an axis of rotation of a drive shaft and wherein, in a mounted state of the shell unit, the grooves are connected to the cooling channel of the bearing receptacle.

2. The pump device as claimed in claim 1, wherein the bearing receptacle has at least one passage opening which is implemented as a pass-through for at least one structural unit.

3. The pump device as claimed in claim 1, wherein the bearing receptacle is produced at least partially in a casting process.

4. The pump device as claimed in claim 1, wherein the at least one cooling channel of the bearing receptacle is implemented by a drilled cooling channel.

5. The pump device as claimed in claim 1, wherein the bearing receptacle has at least two plate-like elements which, in the mounted state, form the at least one cooling channel.

6. The pump device as claimed in claim 1, further comprising at least one receiving region for at least one functional unit, which receiving region, at least partially, is delimited by the bearing receptacle and is cooled via the bearing receptacle in at least one operating state.

7. The pump device as claimed in claim 1, further comprising an explosion protection unit which provides at least one explosion protection feature, wherein the explosion protection unit is made as a reinforced shell and/or as a pressure compensation valve.

8. A pump, in particular a submersible pump, having at least one pump device as claimed in claim 1.

9. The pump as claimed in claim 8, comprising an interior space, wherein the cooling channels of the shell unit provide cooling of the interior space.

10. The pump device as claimed in claim 1, wherein the cooling channels of the shell unit, together with the cooling channels of the bearing receptacle, are at least part of a common cooling circuit, wherein the entire drive shaft can be cooled by way of the cooling circuit.

11. The pump device as claimed in claim 1, wherein the pump device is a submersible pump device.

12. The pump device as claimed in claim 1, wherein the bearing receptacle is in the form of a wall part.

13. The pump device as claimed in claim 1, wherein the bearing receptacle is in the form of a bearing cover.

14. The pump device as claimed in claim 13, wherein the bearing cover is an element which, together with a wall of the pump device, forms an outer closure of a volume.

15. A pump device having at least one bearing receptacle which is configured for receiving a drive shaft end bearing, wherein the bearing receptacle is of plate-like form, has at least one cooling channel for receiving at least one cooling fluid and has at least two plate-like elements which, in a mounted state, form the at least one cooling channel for receiving at least one cooling fluid, wherein the two plate-like elements each have at least one cutout which forms at least one common cooling channel.

16. The pump device as claimed in claim 15, wherein the two plate-like elements are fixed to one another by means of a screw connection.

17. The pump device as claimed in claim 15, wherein the bearing receptacle is in the form of a wall part.

* * * * *